United States Patent
Jeong et al.

(10) Patent No.: US 9,929,385 B2
(45) Date of Patent: Mar. 27, 2018

(54) BATTERY MODULE OF IMPROVED STABILITY

(71) Applicant: LG CHEM, LTD., Seoul (KR)

(72) Inventors: SangYoon Jeong, Daejeon (KR); Jin Kyu Lee, Daejeon (KR); Jong Moon Yoon, Daejeon (KR); JunSeok Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 316 days.

(21) Appl. No.: 13/868,502

(22) Filed: Apr. 23, 2013

(65) Prior Publication Data

US 2013/0230759 A1    Sep. 5, 2013

Related U.S. Application Data

(63) Continuation of application No. PCT/KR2011/008322, filed on Nov. 3, 2011.

(30) Foreign Application Priority Data

Nov. 18, 2010 (KR) ........................ 10-2010-0114779

(51) Int. Cl.
*H01M 2/10* (2006.01)
*B60L 3/00* (2006.01)
(Continued)

(52) U.S. Cl.
CPC ......... *H01M 2/1072* (2013.01); *B60L 3/0007* (2013.01); *B60L 3/0046* (2013.01);
(Continued)

(58) Field of Classification Search
CPC ............ H01M 2/1072; H01M 2/1077; H01M 2/0207; H01M 2/021; H01M 2/0217;
(Continued)

(56) References Cited

U.S. PATENT DOCUMENTS

2006/0177733 A1    8/2006    Ha et al.
2006/0194101 A1    8/2006    Ha et al.
(Continued)

FOREIGN PATENT DOCUMENTS

CN    101401229 A    4/2009
EP    2 031 672 A1    3/2009
(Continued)

OTHER PUBLICATIONS

International Search Report issued in PCT/KR2011/008322, dated May 8, 2012.

*Primary Examiner* — Mark F Huff
*Assistant Examiner* — Omar Kekia
(74) *Attorney, Agent, or Firm* — Birch, Stewart, Kolasch & Birch, LLP

(57) ABSTRACT

Disclosed herein is a battery module having a plurality of plate-shaped battery cells, each of which has electrode terminals respectively formed at the upper end and the lower end thereof, the battery module including two or more battery cells, a buffering member disposed at the interface between the battery cells to restrain movement of the battery cells and to buffer volume change of the battery cells during charge and discharge of the battery cells, and a pair of module housings coupled to entirely cover the outside of a stack of the battery cells excluding the electrode terminals of the battery cells, each of the module housings being formed of a sheet.

11 Claims, 3 Drawing Sheets

(51) Int. Cl.
  *B60L 11/18* (2006.01)
  *H01M 2/20* (2006.01)
  *H01M 2/02* (2006.01)

(52) U.S. Cl.
  CPC ....... B60L 11/1879 (2013.01); *H01M 2/1077* (2013.01); *H01M 2/021* (2013.01); *H01M 2/0207* (2013.01); *H01M 2/0217* (2013.01); *H01M 2/0245* (2013.01); *H01M 2/0277* (2013.01); *H01M 2/0292* (2013.01); *H01M 2/1083* (2013.01); *H01M 2/206* (2013.01); *Y02T 10/705* (2013.01); *Y02T 10/7005* (2013.01)

(58) Field of Classification Search
  CPC ............. H01M 2/0245; H01M 2/0277; H01M 2/0292; H01M 2/1083; H01M 2/206; H01M 10/613; H01M 10/625; B60L 3/0007; B60L 3/0046; B60L 11/1879; Y02T 10/7005; Y02T 10/705
  USPC .................................................. 429/99, 100
  See application file for complete search history.

(56) References Cited

U.S. PATENT DOCUMENTS

| | | | |
|---|---|---|---|
| 2006/0240318 A1* | 10/2006 | Kim et al. | 429/153 |
| 2006/0286441 A1 | 12/2006 | Matsuoka et al. | |
| 2007/0224498 A1 | 9/2007 | Kim et al. | |
| 2008/0299451 A1* | 12/2008 | Funahashi et al. | 429/149 |
| 2009/0297936 A1 | 12/2009 | Nemoto et al. | |
| 2009/0311581 A1 | 12/2009 | Park et al. | |
| 2009/0325043 A1* | 12/2009 | Yoon et al. | 429/90 |
| 2010/0104927 A1 | 4/2010 | Albright | |
| 2010/0255257 A1 | 10/2010 | Asai | |
| 2010/0273042 A1* | 10/2010 | Buck et al. | 429/120 |
| 2010/0273044 A1* | 10/2010 | Culver et al. | 429/160 |
| 2011/0045335 A1 | 2/2011 | Lee et al. | |
| 2011/0256446 A1* | 10/2011 | Bronczyk | H01M 2/1077 429/163 |

FOREIGN PATENT DOCUMENTS

| | | |
|---|---|---|
| JP | 2005-19242 A | 1/2005 |
| JP | 2005-108693 A | 4/2005 |
| JP | 2005-116278 A | 4/2005 |
| JP | 2007-258180 A | 10/2007 |
| JP | 2008-520076 A | 6/2008 |
| JP | 2008-521199 A | 6/2008 |
| JP | 2009-130073 A | 6/2009 |
| KR | 10-2007-0093159 A | 9/2007 |
| KR | 10-2008-0016044 A | 2/2008 |
| KR | 10-2008-0038467 A | 5/2008 |
| WO | WO 2008/007767 A1 | 1/2008 |
| WO | WO 2010/114318 A2 | 10/2010 |

* cited by examiner

[FIG. 1]
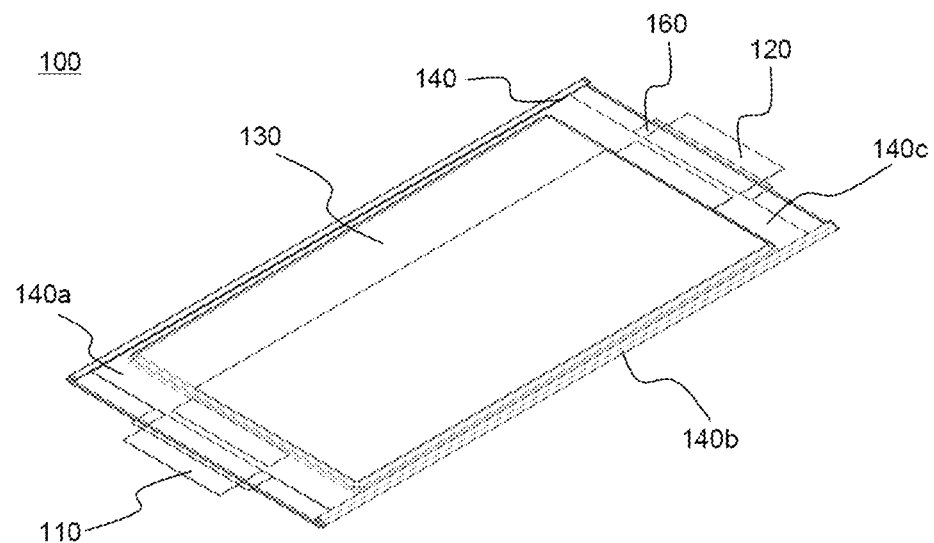
[FIG. 2]
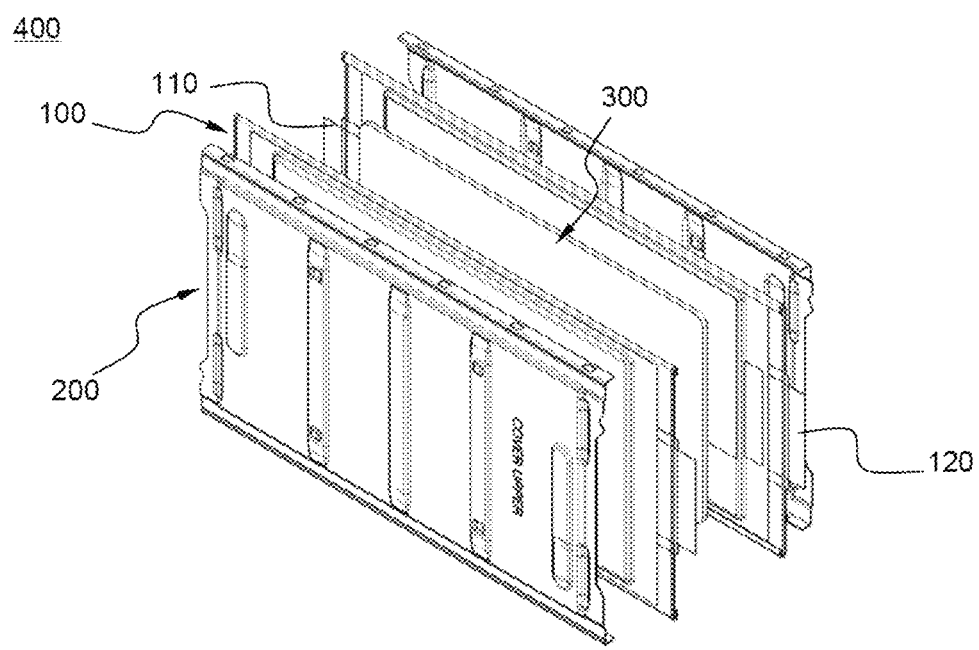

【FIG. 3】
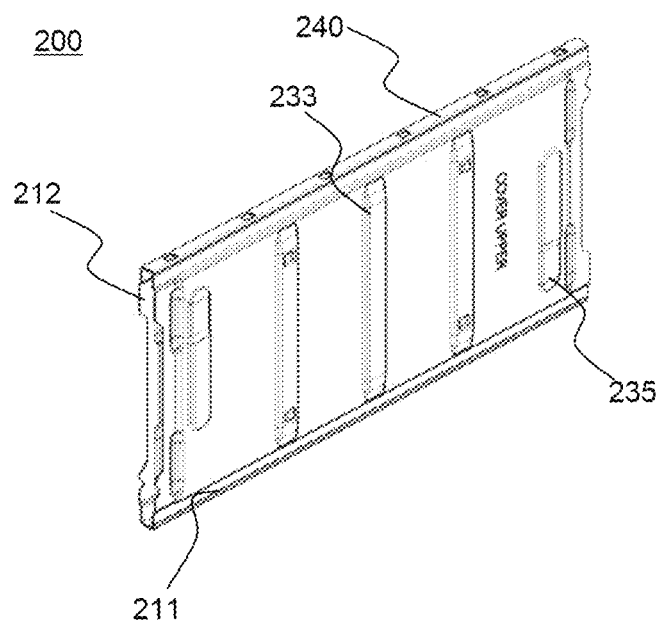
【FIG. 4】
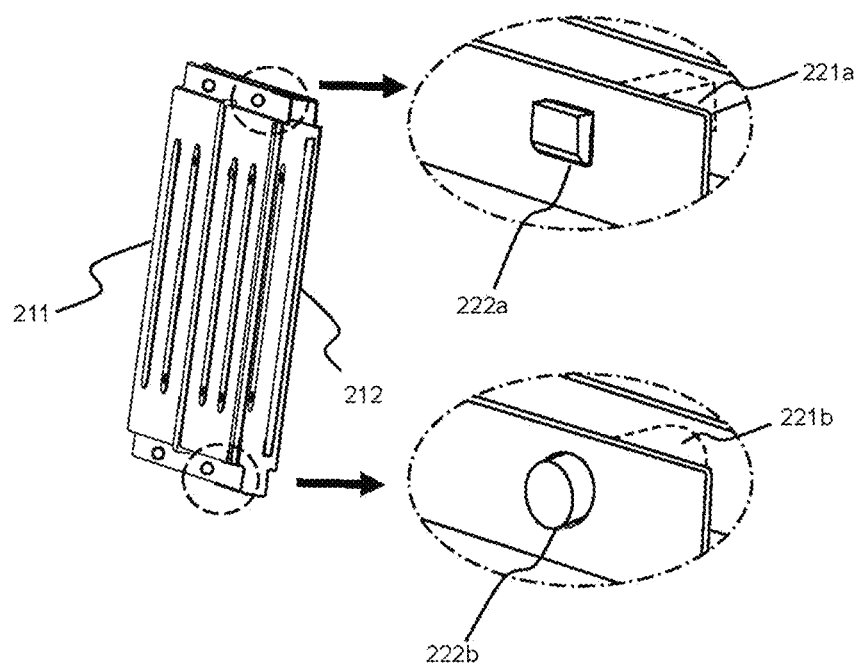

[FIG. 5]
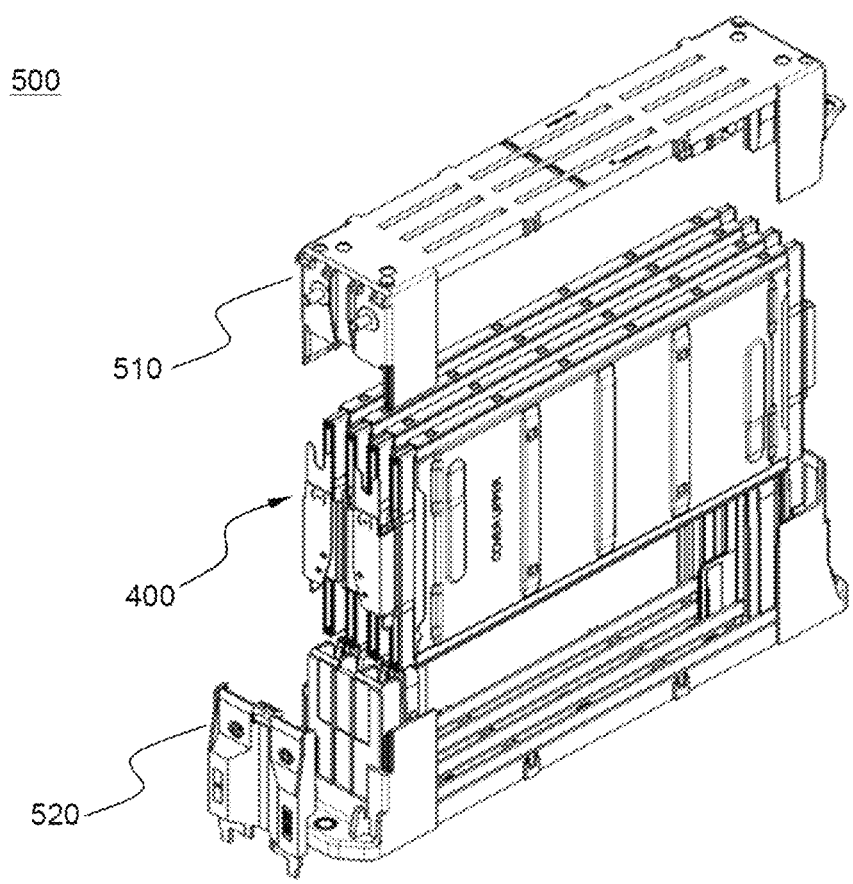

BATTERY MODULE OF IMPROVED STABILITY

CROSS REFERENCE TO RELATED APPLICATIONS

This application is a Continuation of PCT International Application No. PCT/KR2011/008322 filed on Nov. 3, 2011, which claims priority under 35 U.S.C. § 119(a) to Patent Application No. 10-2010-0114779 filed in the Republic of Korea on Nov. 18, 2010, all of which are hereby expressly incorporated by reference into the present application.

TECHNICAL FIELD

The present invention relates to a battery module with improved safety, and, more particularly, to a battery module having a plurality of plate-shaped battery cells, each of which has electrode terminals respectively formed at the upper end and the lower end thereof, the battery module including two or more battery cells, a buffering member disposed at the interface between the battery cells to restrain movement of the battery cells and to buffer volume change of the battery cells during charge and discharge of the battery cells, and a pair of module housings coupled to entirely cover the outside of a stack of the battery cells excluding the electrode terminals of the battery cells, each of the module housings being formed of a sheet.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle- or large-sized battery module having a plurality of battery cells electrically connected to each other because high power and large capacity are necessary for the middle or large-sized devices.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle- or large-sized battery module. In particular, much interest is currently focused on such a pouch-shaped battery, which uses an aluminum laminate sheet as a sheathing member, because the pouch-shaped battery is lightweight and the manufacturing cost of the pouch-shaped battery is low.

FIG. 1 is a perspective view typically showing a conventional representative pouch-shaped battery. A pouch-shaped battery 100 shown in FIG. 1 is configured to have a structure in which two electrode leads 110 and 120 protrude from the upper end and the lower end of a battery body 130, respectively, such that the electrode leads 110 and 120 are opposite to each other.

A sheathing member 140 includes upper and lower sheathing parts. That is, the sheathing member 140 is a two-unit member. In a state in which an electrode assembly (not shown) is mounted in a receiving part which is defined between the upper and lower sheathing parts of the sheathing member 140, opposite sides 140a and upper and lower ends 140b and 140c, which are contact regions of the upper and lower sheathing parts of the sheathing member 140, are bonded to each other, whereby the pouch-shaped battery 100 is manufactured. The sheathing member 140 is configured to have a laminate structure of a resin layer/a metal film layer/a resin layer. Consequently, it is possible to bond the opposite sides 140a and the upper and lower ends 140b and 140c of the upper and lower sheathing parts of the sheathing member 140, which are in contact with each other, to each other by applying heat and pressure to the opposite sides 140a and the upper and lower ends 140b and 140c of the upper and lower sheathing parts of the sheathing member 140 so as to weld the resin layers thereof to each other. According to circumstances, the opposite sides 140a and the upper and lower ends 140b and 140c of the upper and lower sheathing parts of the sheathing member 140 may be bonded to each other using a bonding agent.

For the opposite sides 140a of the sheathing member 140, the same resin layers of the upper and lower sheathing parts of the sheathing member 140 are in direct contact with each other, whereby uniform sealing at the opposite sides 140a of the sheathing member 140 is achieved by welding. For the upper and lower ends 140b and 140c of the sheathing member 140, on the other hand, the electrode leads 110 and 120 protrude from the upper and lower ends 140b and 140c of the sheathing member 140, respectively. For this reason, the upper and lower ends 140b and 140c of the upper and lower sheathing parts of the sheathing member 140 are thermally welded to each other, in a state in which a film type sealing member 160 is interposed between the electrode leads 110 and 120 and the sheathing member 140, in consideration of the thickness of the electrode leads 110 and 120 and the difference in material between the electrode leads 110 and 120 and the sheathing member 140, so as to improve sealability of the sheathing member 140.

However, the mechanical strength of the sheathing member 140 is low. For this reason, battery cells (unit cells) are mounted in a pack case, such as a cartridge, to manufacture a battery module having a stable structure. However, a device or a vehicle, in which a middle- or large-sized battery module is installed, has a limited installation space. Consequently, when the size of the battery module is increased due to the use of the pack case, such as the cartridge, the spatial utilization is lowered. Also, due to the low mechanical strength of the battery cells, the battery cells repeatedly expand and contract during charge and discharge of the battery cells. As a result, the thermally welded regions of the sheathing member may be easily separated from each other.

There have been proposed some technologies regarding module housings to cover outer surfaces of the pouch-shaped battery cells, thereby securing the safety of the battery cells.

For example, Japanese Patent Application Publication No. 2005-108693 discloses a technology regarding module housings including a pair of elastic parts, having the same elasticity, to support opposite major surfaces of a plate-shaped laminate battery cell.

The above technology proposes a structure to elastically press opposite major surfaces of the battery cell using the module housings, each of which is bent in a concave shape. However, the overall size of the battery cell is inevitably increased due to the additional attachment of the module housings to the opposite major surfaces of the battery cell. Also, it is required that the battery cell be inserted into the module housings with the above-stated construction. As a result, the assembly process is not easily performed, and therefore, mass production is difficult. That is, when the battery cell is forcibly inserted into the module housings, excessive load is applied to the battery cell with the result that the battery cell may be damaged.

Meanwhile, the thickness of battery cells (secondary batteries) may be changed during charge and discharge of the battery cells with the result that a gap may be formed between the battery cells. In this case, the battery cells may not be fixed in position when external impact or vibration is applied to the battery cells. Also, in a structure in which the battery cells are in direct contact with each other, the battery cells may easily slip from each other due to low frictional force between battery cases of the respective battery cells. As a result, the battery cell may move.

In a case in which the battery cells are not fixed in position but move due to various causes as described above, electrode terminal connection regions of the battery cells may be broken, or short circuits may occur in the battery cells. As a result, the safety and operational efficiency of the battery module are greatly lowered.

Consequently, there is a high necessity for a battery module that is compact, effectively buffers external impact, and exhibits excellent stability and safety.

DISCLOSURE

Technical Problem

Therefore, the present invention has been made to solve the above problems and other technical problems that have yet to be resolved.

It is an object of the present invention to provide a battery module that is capable of restraining movement of battery cells and buffering volume change of the battery cells during charge and discharge of the battery cells while effectively increasing low mechanical strength of battery cells.

Technical Solution

In accordance with one aspect of the present invention, the above and other objects can be accomplished by the provision of a battery module having a plurality of plate-shaped battery cells, each of which has electrode terminals respectively formed at the upper end and the lower end thereof, the battery module including two or more battery cells, a buffering member disposed at the interface between the battery cells to restrain movement of the battery cells and to buffer volume change of the battery cells during charge and discharge of the battery cells, and a pair of module housings coupled to entirely cover the outside of a stack of the battery cells excluding the electrode terminals of the battery cells, each of the module housings being formed of a sheet.

In the battery module according to the present invention, the buffering member buffers volume change of the battery cells caused by the repetitive expansion and contraction change of the battery cells during charge and discharge of the battery cells and increases frictional force between the battery cells to restrain movement of the battery cells.

Also, the module housings restrain the repetitive expansion and contraction change of the battery cells during charge and discharge of the battery cells, while protecting the battery cells having low mechanical strength, to restrain the increase in internal resistance of the battery cells and to prevent separation between sealed regions of the battery cells, thereby improving operation and lifespan characteristics and safety of the battery module.

The plate-shaped battery cells are secondary batteries having a small thickness and a relatively large width and length such that the total size of the secondary batteries is minimized when the secondary batteries are stacked to constitute a battery module. In a preferred example, each of the plate-shaped battery cells may be a secondary battery configured to have a structure in which an electrode assembly is mounted in a battery case made of a laminate sheet including a resin layer and a metal layer, and electrode terminals protrude from upper and lower ends of the battery case. Specifically, each of the plate-shaped battery cells may be configured to have a structure in which an electrode assembly is mounted in a pouch-shaped battery case made of an aluminum laminate sheet. The secondary battery with the above-stated construction may be referred to as a pouch-shaped battery cell.

The material for the buffering member disposed at the interface between the battery cells is not particularly restricted so long as the buffering member can buffer volume change of the battery cells and increase frictional force between the battery cells to restrain movement of the battery cells. The buffering member may be formed of a polymer resin having a porous structure. The porous structure may be a porous structure including open pores or a porous structure including closed pores.

Kind of the polymer resin is not particularly restricted. For example, polyethylene, polypropylene, polybutylene, polystyrene, natural rubber, synthetic rubber, nitrile butadiene rubber (NBR), and acrylonitrile butadiene styrene (ABS) may be used.

Each of the module housings has an internal structure corresponding to the shape of the outside of the battery cell stack. In particular, the module housings are coupled to each other in an assembly fastening fashion requiring no additional fastening members. As a representative example, sectional coupling portions of the module housings may be configured to have male and female fastening structures, by which the module housings are engaged with each other by elastic coupling when the module housings are pressed in a state in which the module housings are in contact with each other such that the module housings face each other.

Meanwhile, heat is generated from a secondary battery during charge and discharge of the secondary battery, and the heat must be effectively discharged from the secondary battery to extend the lifespan of the secondary battery. Consequently, each of the module housings may be formed of a metal sheet exhibiting high heat conductivity to more easily discharge heat from the battery cells.

In a preferred example, each of the module housings may be provided at sides adjacent to the upper end and the lower end thereof with depressed steps of a predetermined size to easily fix the battery cells. According to circumstances, the steps may be formed at sides adjacent to the left end and the right end of each of the module housings. Preferably, the steps are formed at the sides adjacent to the upper and lower ends and the left and right ends of each of the module housings to more securely fix the battery cells.

The battery cells may be fixed to the upper end and the lower end of each of the module housings in various manners. For more efficient fixing, each of the depressed steps may have a shape and size corresponding to the sealed portion of each of the battery cells.

It is possible to maximally restrain movement of the battery cells through the combination of the steps of the module housings and the burring member.

In a preferred example, each of the module housings may be provided at the outside thereof with a plurality of linear beads spaced apart from each other in the width direction (lateral direction) to provide a coolant flow space. In the above structure, each of the beads may have opposite ends reaching corresponding ends of the module housings. Consequently, coolant (for example, air) can flow in the width direction of the module housings in a state in which battery modules are stacked, thereby further improving cooling efficiency.

Also, each of the module housings may be provided at the top and bottom of the outside thereof with bars having opposite shapes in the width direction (lateral direction). When the battery modules are stacked, therefore, each of the battery modules has a shape corresponding to that of one adjacent battery module with the result that it is possible to prevent stacked positions of the battery modules from being reversed or misaligned.

In accordance with another aspect of the present invention, there is provided a middle or large-sized battery pack manufactured using the battery module with the above-stated construction as a unit body.

The middle or large-sized battery pack is manufactured by electrically and mechanically connecting a plurality of secondary batteries to provide high power and large capacity. For example, the middle or large-sized battery pack may be manufactured by mounting a stack of two or more unit battery modules in pack frames in a state in which the battery module stack is erected in a lateral direction.

In accordance with a further aspect of the present invention, there is provided a vehicle including the battery pack with the above-stated construction as a power source.

When considering installation efficiency and structural stability based on desired power and capacity, the vehicle may be an electric vehicle, a hybrid electric vehicle, or a plug-in hybrid electric vehicle.

DESCRIPTION OF DRAWINGS

The above and other objects, features and other advantages of the present invention will be more clearly understood from the following detailed description taken in conjunction with the accompanying drawings, in which:

FIG. 1 is an exploded perspective view showing general structure of a conventional pouch-shaped secondary battery;

FIG. 2 is an exploded perspective view showing a battery module according to an embodiment of the present invention;

FIG. 3 is a perspective view showing module housings of FIG. 2;

FIG. 4 is an enlarged view showing the coupled structure of the module housings of FIG. 2; and FIG. 5 is a perspective view showing a middle or large-sized battery pack manufactured by stacking a plurality of battery modules.

BEST MODE

Now, preferred embodiments of the present invention will be described in detail with reference to the accompanying drawings. It should be noted, however, that the scope of the present invention is not limited by the illustrated embodiments.

FIG. 2 is an exploded perspective view typically showing a battery module according to an embodiment of the present invention.

Referring to FIG. 2, a battery module 400 including two plate-shaped battery cells 100, each of which has electrode terminals 110 and 120 respectively formed at the upper end and the lower end thereof, is configured to have a structure in which a buffering member 300 is disposed at the interface between the battery cells 100, and the battery cells 100 are coupled to each other by a pair of module housings 200.

The buffering member 300 is formed of a polymer resin having a porous structure. Consequently, the buffering member 300 buffers volume change of the battery cells caused by the repetitive expansion and contraction change of the battery cells during charge and discharge of the battery cells and increases frictional force between the battery cells to restrain movement of the battery cells.

The module housings 200 include a pair of module housings 200 coupled to entirely cover the outside of a stack of the battery cells 100 excluding the electrode terminals 110 and 120 of the battery cells 100. The module housings 200 restrain the repetitive expansion and contraction change of the battery cells during charge and discharge of the battery cells, while protecting the battery cells having low mechanical strength, thereby preventing separation between sealed regions of the battery cells.

FIG. 3 is a perspective view typically showing the module housings of FIG. 2. Referring to FIG. 3 together with FIG. 2, each of the module housings 200 is provided at sides adjacent to opposite ends thereof with steps 240 to easily fix the battery module. Also, each of the module housings 200 is provided at the outside thereof with a plurality of linear beads 233 spaced apart from each other in the width direction. Each of the beads 233 has opposite ends reaching corresponding ends of the module housings. Consequently, a coolant (for example, air) can flow in the width direction of the module housings in a state in which battery modules are stacked, thereby further improving cooling efficiency.

Also, each of the module housings 200 is provided at the top and bottom thereof with bars 235 having opposite shapes in the width direction (lateral direction). When the battery modules are stacked, therefore, each of the battery modules has a shape corresponding to that of one adjacent battery module with the result that it is possible to prevent stacked positions of the battery modules from being reversed or misaligned.

Also, the module housings 200 include a pair of a left housing 211 and a right housing 212, which can be coupled to each other without using additional fastening members.

The coupled structure of the module housings 200 is shown in detail in FIG. 4. FIG. 4 is a sectional view and partially enlarged views showing the module housings 200. Referring to FIG. 4, the module housings 211 and 212 are configured to have male and female fastening structures 221 and 222, by which the module housings 211 and 212 are engaged with each other by elastic coupling when the module housings 211 and 212 are pressed in a state in which the module housings 211 and 212 are in contact with each other such that the module housings 211 and 212 face each other.

Various fastening structures may be used. For example, hexahedral fastening structures 221a and 222a and cylindrical fastening structures 221b and 222b may be used. In a fastening process, the fastening structures are engaged with each other to increased coupling force.

Consequently, strong mechanical coupling is achieved without the provision of additional coupling members or performance of a processing process to assemble the module housings 200. This simple and easy coupling structure is preferably applied to mass production.

FIG. 5 is a perspective view showing a middle or large-sized battery pack 500 in which a plurality of unit battery modules 400 is stacked. Four unit battery modules 400 according to the present invention constitute one middle or large-sized battery pack 500. Consequently, the middle or large-sized battery pack 500 includes a total of eight battery cells 100. That is, a stack of the four unit battery modules 400 is mounted in pack frames 510 and 520 in a state in which the stack of four unit battery modules 400 is erected in the lateral direction, whereby the middle or large-sized battery pack 500 is manufactured.

A plurality of battery packs 500 may be connected to manufacture a middle or large-sized battery system having higher power and larger capacity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, in the battery module according to the present invention, low mechanical strength of the battery cells is increased by the module housings, and movement of the battery cells is restrained and the volume change of the battery cells during charge and discharge of the battery cells are buffered by the buffing member. Consequently, it is possible to improve operation and lifespan characteristics of the battery module and secure stability and safety of the battery module against external force.

The invention claimed is:

1. A battery module having a plurality of plate-shaped battery cells, each of which has electrode terminals respectively formed at an upper end and a lower end thereof, the battery module comprising:
    two battery cells;
    a buffering member disposed at an interface between the battery cells to restrain movement of the battery cells and to buffer volume change of the battery cells during charge and discharge of the battery cells; and
    a pair of module housings coupled to entirely cover an outside of a stack of the battery cells excluding the electrode terminals of the battery cells, each of the module housings being formed of a sheet, wherein
    the buffering member is disposed inside the coupled pair of module housings,
    each of the module housings has an internal structure corresponding to a shape of the outside of the battery cell stack,
    sectional coupling portions of the module housings are configured to have male and female fastening structures, by which the module housings are engaged with each other by elastic coupling when the module housings are pressed in a state in which the module housings are in contact with each other such that the module housings face each other,
    each of the module housings is provided at sides adjacent to an upper end and a lower end thereof with depressed steps of a predetermined size to fix the battery cells,
    each of the depressed steps has a shape and size corresponding to a sealed portion of each of the battery cells,
    the battery module consisting of a sequentially stacked arrangement of a first module housing of the pair of module housings, one of the two battery cells, the buffering member, another of the two battery cells, and a second module housing of the pair of module housings, and
    each of the module housings is provided at a top and bottom of an outside thereof with a first bar having a first shape extending in a width direction of the module housing and a second bar having a second shape extending in the width direction of the module housing, the first shape and second shape being configured to cooperate with each other such that when adjacent battery modules are fit together they fit with only a single orientation.

2. The battery module according to claim 1, wherein each of the plate-shaped battery cells is configured to have a structure in which an electrode assembly is mounted in a battery case formed of a laminate sheet comprising a metal layer and a resin layer, and outer edges of the battery case is sealed.

3. The battery module according to claim 1, wherein the buffering member is formed of a polymer resin having a porous structure.

4. The battery module according to claim 1, wherein the buffering member is configured to have a porous structure comprising open pores or closed pores.

5. The battery module according to claim 1, wherein each of the module housings is formed of a metal sheet.

6. The battery module according to claim 1, wherein each of the module housings is provided at the outside thereof with a plurality of linear beads spaced apart from each other in a width direction (lateral direction) to provide a coolant flow space.

7. The battery module, according to claim 6, wherein each of the beads has opposite ends reaching corresponding ends of the module housings.

8. A battery pack comprising a battery module according to claim 1 as a unit body, wherein the battery pack comprises two or more battery modules.

9. The battery pack according to claim 8, wherein a stack of the two or more unit battery modules is mounted in pack frames in a state in which the battery module stack is erected in a lateral direction.

10. A vehicle comprising a battery pack according to claim 8 as a power source.

11. The vehicle according to claim 10, wherein the vehicle is an electric vehicle, a hybrid electric vehicle, or a plug-in hybrid electric vehicle.

* * * * *